United States Patent
Lu et al.

(10) Patent No.: US 10,970,909 B2
(45) Date of Patent: Apr. 6, 2021

(54) METHOD AND APPARATUS FOR EYE MOVEMENT SYNTHESIS

(71) Applicant: BEIHANG UNIVERSITY, Beijing (CN)

(72) Inventors: Feng Lu, Beijing (CN); Qinping Zhao, Beijing (CN)

(73) Assignee: BEIHANG UNIVERSITY, Beijing (CN)

(*) Notice: Subject to any disclaimer, the term of this patent is extended or adjusted under 35 U.S.C. 154(b) by 0 days.

(21) Appl. No.: 16/725,634

(22) Filed: Dec. 23, 2019

(65) Prior Publication Data
US 2020/0349750 A1 Nov. 5, 2020

(30) Foreign Application Priority Data
Apr. 30, 2019 (CN) .......................... 201910365222.6

(51) Int. Cl.
*G06T 13/40* (2011.01)
*G06F 3/01* (2006.01)
(Continued)

(52) U.S. Cl.
CPC .............. *G06T 13/40* (2013.01); *G06F 3/013* (2013.01); *G06F 3/017* (2013.01); *G06F 3/16* (2013.01); *G06T 13/205* (2013.01)

(58) Field of Classification Search
None
See application file for complete search history.

(56) References Cited

U.S. PATENT DOCUMENTS

2010/0082345 A1* 4/2010 Wang .................... G06T 13/205
704/260
2014/0002356 A1* 1/2014 Dahlkvist ............... G06F 16/31
345/157

(Continued)

FOREIGN PATENT DOCUMENTS

| CN | 101419499 A | 4/2009 |
| CN | 102129343 A | 7/2011 |

(Continued)

OTHER PUBLICATIONS

Xucling, Wei et al., "Research on realistic emotional avatar" Chinese Journal—Application Research of Computers; vol. 33, No. 12; (Dec. 2016); pp. 3852-3857.

(Continued)

*Primary Examiner* — Frank S Chen
(74) *Attorney, Agent, or Firm* — J.C. Patents (57) ABSTRACT

Embodiments of the present disclosure provide a method and an apparatus for eye movement synthesis, the method including: obtaining eye movement feature data and speech feature data, wherein the eye movement feature data reflects an eye movement behavior, and the speech feature data reflects a voice feature; obtaining a driving model according to the eye movement feature data and the speech feature data, wherein the driving model is configured to indicate an association between the eye movement feature data and the speech feature data; synthesizing an eye movement of a virtual human according to speech input data and the driving model and controlling the virtual human to exhibit the synthesized eye movement. The embodiment makes the virtual human to exhibit an eye movement corresponding to the voice data according to the eye movement feature data and the speech feature data, thereby improving the authenticity in the interaction.

16 Claims, 5 Drawing Sheets

(51) Int. Cl.
G06F 3/16 (2006.01)
G06T 13/20 (2011.01)

(56) References Cited

U.S. PATENT DOCUMENTS

2014/0055554 A1 2/2014 Du et al.
2018/0232928 A1* 8/2018 Grant ...................... G06F 3/013

FOREIGN PATENT DOCUMENTS

CN 103218842 A 7/2013
CN 206426108 U 8/2017

OTHER PUBLICATIONS

The Chinese First Examination Report of corresponding Chinese application No. 201910365222.6, dated Jan. 21, 2020.
The Notice of Allowance of priority CN application No. 2019103652226.
"Eye, Lip and Crying Expression for Virtual Human", Int. Journal of Interactive Digital Media, vol. 1(2), ISSN 2289-4101.

* cited by examiner

METHOD AND APPARATUS FOR EYE MOVEMENT SYNTHESIS

CROSS-REFERENCE TO RELATED APPLICATION

This application claims priority to Chinese Patent Application No. 201910365222.6, filed on Apr. 30, 2019, which is hereby incorporated by reference in its entirety.

TECHNICAL FIELD

Embodiments of the present disclosure relates to computer vision technologies and, in particular, to a method and an apparatus for eye movement synthesis.

BACKGROUND

With the rapid development of virtual reality technologies and human-machine interaction technologies, the application of virtual human has extended to various fields, where the eye movement of the virtual human can effectively provide a natural interaction between a user and the virtual human.

At present, when realizing the eye movement of a virtual human in prior art, a stacked hourglass network and a dense network is typically constructed to estimate a line of sight to obtain a line of sight direction, and then the eye movement of the virtual human is controlled according to the line of sight direction.

However, in the prior art, the eye movement of the virtual human cannot correspond to the voice data of the virtual human, resulting in artificialness and lack of authenticity in the eye movement of the virtual human.

SUMMARY

Embodiments of the present disclosure provide a method and an apparatus for eye movement synthesis in order to overcome the problem of the artificialness and lack of authenticity in the eye movement of the virtual human.

In a first aspect, an embodiment of the present disclosure provides a method for eye movement synthesis, including:
obtaining eye movement feature data and speech feature data, where the eye movement feature data reflects an eye movement behavior, and the speech feature data reflects a voice feature;
obtaining a driving model according to the eye movement feature data and the speech feature data, where the driving model is configured to indicate an association between the eye movement feature data and the speech feature data;
synthesizing an eye movement of a virtual human according to speech input data and the driving model and controlling the virtual human to exhibit the synthesized eye movement.

In a possible design, the obtaining a driving model according to the eye movement feature data and the speech feature data includes:
normalizing the eye movement feature data and the speech feature data separately to obtain eye movement feature data and speech feature data in a common data format;
performing data alignment to the eye movement feature data and the speech feature data in the common data format according to a time series corresponding thereto to obtain eye movement feature data and speech feature data aligned in time series; and
obtaining a driving model according to the eye movement feature data and the speech feature data aligned in time series.

In a possible design, the time series comprises a plurality of time points, and the obtaining a driving model according to the eye movement feature data and the speech feature data aligned in time series includes:
inputting the eye movement feature data and the speech feature data at each of the time points into a preset processing model to obtain an association between the eye movement feature data and the speech feature data at each of the time points, wherein the preset processing model is configured to obtain an association between eye movement feature data and speech feature data; and
obtaining a driving model according to the associations between the eye movement feature data and the speech feature data at each of the time points.

In a possible design, the obtaining eye movement feature data and speech feature data includes:
obtaining eye movement data and speech data in a natural setting, wherein the eye movement data and the speech data are associated in time series; and
processing the eye movement data and the speech data separately to obtain the eye movement feature data and the speech feature data.

In a possible design, the eye movement feature data includes at least one of the following: a pupil diameter, a point of gaze, a gaze duration, a line of sight direction, an eyeball rolling speed, an eyeball rolling track, an eyeball rolling pattern, and a blinking motion; and
the speech feature data comprises at least one of the following: a voice content, a syntactic structure, a voice emotion, a phoneme, a rhythm, and an intonation.

In a possible design, the synthesizing an eye movement of a virtual human according to speech input data and the driving model comprises:
inputting speech input data into the driving model to obtain eye movement behavior data output from the driving model, wherein the eye movement behavior data indicates an eye movement behavior; and
synthesizing an eye movement of a virtual human according to the eye movement behavior data.

In a possible design, after the obtaining eye movement behavior data output from the driving model, the method further comprises:
inputting the eye movement behavior data output from the driving model into a psychological correcting model to obtain psychologically corrected eye movement behavior data, wherein the psychological correcting model is configured to make correction based on influence of psychological behavior on the eye movement behavior; and/or
inputting the eye movement behavior data output from the driving model into a time domain correcting model to obtain eye movement behavior data that are continuous in time domain, wherein the time domain correcting model is configured to make an eye movement behavior to be continuous in time domain.

In a second aspect, an embodiment of the present disclosure provides an apparatus for eye movement synthesis, including:
an obtaining module, configured to obtain the eye movement feature data and the speech feature data, wherein the eye movement feature data reflects an eye movement behavior, and the speech feature data reflects a voice feature;
a modeling module, configured to obtain a driving model according to the eye movement feature data and the speech feature data, wherein the driving model is configured to indicate an association between the eye movement feature data and the speech feature data; and a synthesizing module, configured to synthesize an eye movement of a virtual human according to speech input data and the driving model and controlling the virtual human to exhibit the synthesized eye movement.

In a possible design, the modeling module is specifically configured to:

normalize the eye movement feature data and the speech feature data separately to obtain eye movement feature data and speech feature data in a common data format;

perform data alignment to the eye movement feature data and the speech feature data in the common data format according to a time series corresponding thereto to obtain eye movement feature data and speech feature data aligned in time series; and obtain a driving model according to the eye movement feature data and the speech feature data aligned in time series.

In a possible design, the modeling module is specifically configured to:

input the eye movement feature data and the speech feature data at each of the time points into a preset processing model to obtain an association between the eye movement feature data and the speech feature data at each of the time points, where the preset processing model is configured to obtain an association between eye movement feature data and speech feature data; and obtain a driving model according to the associations between the eye movement feature data and the speech feature data at each of the time points.

In a possible design, the obtaining module is specifically configured to:

obtain eye movement data and speech data in a natural setting, where the eye movement data and the speech data are associated in time series; and process the eye movement data and the speech data separately to obtain the eye movement feature data and the speech feature data.

In a possible design, the eye movement feature data comprises at least one of the following: a pupil diameter, a point of gaze, a gaze duration, a line of sight direction, an eyeball rolling speed, an eyeball rolling track, an eyeball rolling pattern, and a blinking motion; and the speech feature data comprises at least one of the following: a voice content, a syntactic structure, a voice emotion, a phoneme, a rhythm, and an intonation.

In a possible design, the synthesizing module is specifically configure to:

input speech input data into the driving model to obtain eye movement behavior data output from the driving model, wherein the eye movement behavior data indicates an eye movement behavior; and synthesize an eye movement of a virtual human according to the eye movement behavior data.

In a possible design, a correcting module is further included.

The correcting module is specifically configured to: after the eye movement behavior data output from the driving model is obtained, input the eye movement behavior data output from the driving model into a psychological correcting model to obtain psychologically corrected eye movement behavior data, where the psychological correcting model is configured to make correction based on influence of psychological behavior on the eye movement behavior; and/or input the eye movement behavior data output from the driving model into a time domain correcting model to obtain eye movement behavior data that are continuous in time domain, where the time domain correcting model is configured to make an eye movement behavior to be continuous in time domain.

In a third aspect, an embodiment of the present disclosure provides a device for eye movement synthesis, including:

a memory, configure to store a program;

a processor, configured to execute the program stored in the memory, the processor being configured to, when the program is executed, perform the method according to the first aspect and any of the various possible designs thereof.

In a fourth aspect, an embodiment of the present disclosure provides a computer readable storage medium, including instructions which, when executed by a computer, causes the computer to perform the method according to the first aspect and any of the various possible designs thereof.

Embodiments of the present disclosure provide a method and an apparatus for eye movement synthesis, the method including: obtaining eye movement feature data and speech feature data, wherein the eye movement feature data reflects an eye movement behavior, and the speech feature data reflects a voice feature; obtaining a driving model according to the eye movement feature data and the speech feature data, wherein the driving model is configured to indicate an association between the eye movement feature data and the speech feature data; synthesizing an eye movement of a virtual human according to speech input data and the driving model and controlling the virtual human to exhibit the synthesized eye movement. By constructing the driving model according to the association between the eye movement feature data and the speech feature data, the virtual human can exhibit eye movement data corresponding to the voice data, thereby avoiding the artificialness in the eye movement behavior of the virtual human and improving the authenticity in the interaction.

BRIEF DESCRIPTION OF DRAWINGS

In order to illustrate the technical solutions in embodiments of the present disclosure or the prior art more clearly, the accompanying drawings needed to be used in the descriptions of embodiments and the prior art will be simply described below. Obviously, the accompanying drawings in the following description are several embodiments of the present disclosure, and other drawings may be obtained according to these drawings without paying creative labor for a person skilled in the art.

DESCRIPTION OF EMBODIMENTS

In order to make the purposes, the technical solutions and the advantages of embodiments of the present disclosure clearer, the technical solutions in embodiments of the present disclosure will be clearly and comprehensively described with reference to the accompanying drawings in embodiments of the present disclosure. Obviously, the embodiments described are part of the embodiments of the disclosure, not all of the embodiments. Any and all other embodiments obtained by a person skilled in the art based on embodiments of the present disclosure without paying creative labor are within the protection scope of the present disclosure.

Figure 1:
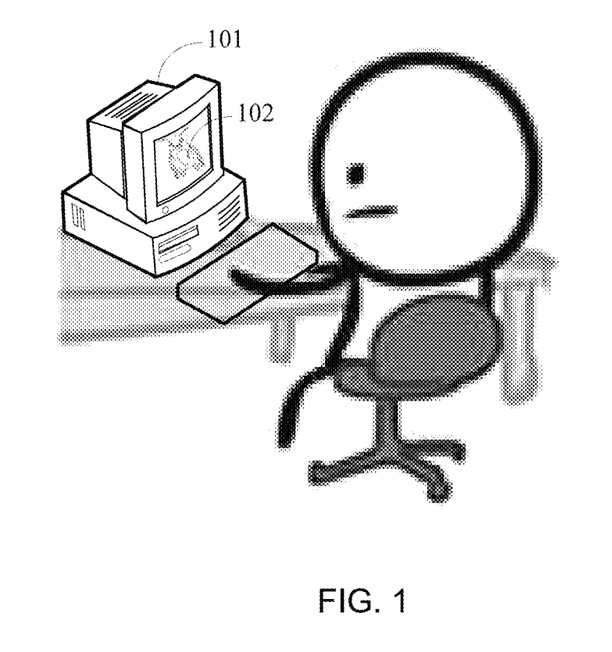
FIG. 1 is a schematic systematic diagram of a method for eye movement synthesis provided by an embodiment of the present disclosure.

FIG. 1 is a schematic systematic diagram of a method for eye movement synthesis provided by an embodiment of the present disclosure. As shown in FIG. 1, the system includes: a terminal device 101 and a virtual human 102.

In the present disclosure, the terminal device 101 may be a mobile terminal or a mobile user equipment and the like, and the terminal device may communicate with one or more core networks via a radio access network (RAN). The mobile terminal may be, e.g., a mobile phone (or refer as to a "cellular" phone), an in-vehicle processing device or a computer with mobility and the like, where the computer with mobility may be, e.g., a portable computer, a pocket-size computer, a handheld computer, a peripheral advertisement projection screen, a processor bearing a virtual reality eye and the like.

Additionally, the virtual human 102 is referring to a virtual character that is implemented by digital simulation technology and displayed on a screen of the terminal device 101, where the virtual human 102 can mimic a human behavior, such as speaking, blinking, smiling and the like. The appearance of the virtual human may be similar to that of a real human, or may also be set to any non-human appearance, and the specific design and function of the virtual human 102 are not limited herein.

In the present embodiment, the virtual human at least includes an eye movement behavior. Specifically, a user may interact with the virtual human via the terminal device by way of, e.g., voice interaction, or the interaction may be done via a mouse, a keyboard and/or other peripheral devices, which will not be limited in the present embodiment.

In the prior art, the eye movement behavior is usually realized in the virtual human by obtaining the line of sight direction through line of sight estimation, and then controlling the eye movement behavior of the virtual human according to the line of sight direction. the eye movement behavior thus realized in the virtual human is decoupled from the voice, resulting in an artificialness and lack of liveliness in the eye movement of the virtual human.

Base on the above-mentioned problems, the present disclosure provides a method for eye movement synthesis, which will be described in detail below with reference to specific embodiments. Firstly, a description will be given in connection with FIG. 2.

Figure 2:
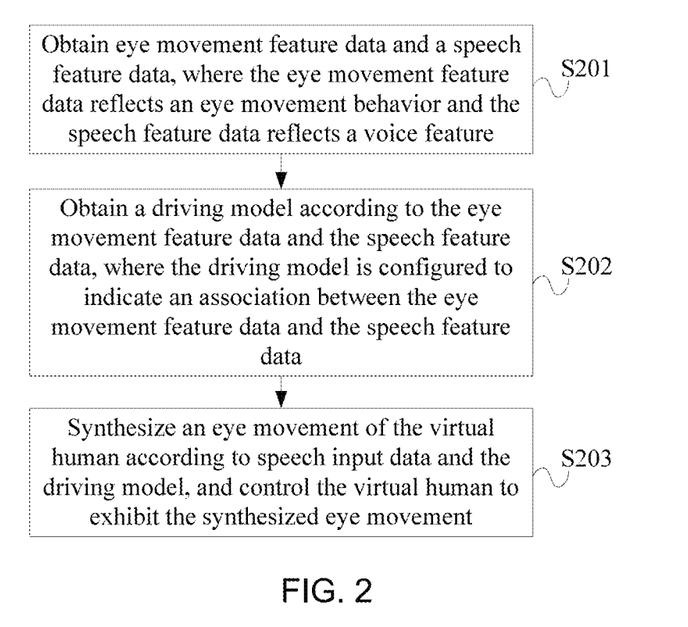
FIG. 2 is flowchart 1 of a method for eye movement synthesis provided by an embodiment of the present disclosure.

FIG. 2 is flowchart 1 of a method for eye movement synthesis provided by an embodiment of the present disclosure. As shown in FIG. 2, the method includes:

S201, obtaining eye movement feature data and speech feature data, where the eye movement feature data reflects an eye movement behavior and the speech feature data reflects a voice feature.

the eye movement behavior is referring to an action of the eye, which may include, e.g., blinking, line of sight moving, pupil changing and other action related to the eye. A person skilled in the art can understand that any action related to the eye may be the eye movement behavior in the present embodiment.

Furthermore, the eye movement feature data reflects an eye movement behavior. For example, the eye movement feature data may include visual data of the eye movement, such as pupil diameter. Or, the eye movement feature data may also include a gaze index of the eye movement, such as point of gaze, gaze duration. Or, the eye movement feature data may also include a dynamic index of the eye movement, such as eyeball rolling speed, rolling track and the like, where the specific setting of the eye movement feature data may be set according to actual needs, and any data that may be used in modeling an eye movement behavior may be considered as eye movement feature data, which is not limited herein.

The speech feature data reflects a voice feature. For example, it may include, e.g., voice content, syntactic structure, intonation and the like, associated with the voice. Any data that may be used in modeling a feature of the voice may be considered as speech feature data, and the specific implementation thereof may be selected according to actual needs, which is not limited herein.

In a possible implementation, for example, image data and corresponding voice data may be collected from a real user in a natural setting, and then the image data may be analyzed to derive the eye movement data, thereby obtaining eye movement feature data. Additionally, the voice data may be analyzed to derive the speech data, thereby obtaining speech feature data, where the analyzing may be accomplished by, such as, an automatic eye movement tracking algorithm, a speech recognition and the like, which is not limited in the present embodiment.

In another possible implementation, for example, the eye movement feature data and speech feature data of the virtual human may be acquired directly from a network resource. The implementations for obtaining the eye movement feature data and the speech feature data are not limited in the present embodiment.

S202, obtaining a driving model according to the eye movement feature data and the speech feature data, where the driving model is configured to indicate an association between the eye movement feature data and the speech feature data.

In the present embodiment, for a virtual human to exhibit a corresponding eye movement behavior according to the voice data corresponding to the utterance when the virtual human speaks, it is necessary to firstly establish the association between the eye movement behavior and the voice behavior.

Specifically, the driving model configured to indicate the association between the eye movement feature data and the speech feature data is obtained according to the eye movement feature data and the speech feature data, where the specific implementation of constructing the driving model may be done by, for example, using a machine learning algorithm to process the eye movement feature data and the speech feature data and analyze the association therebetween, where the association may be, e.g., the line of sight direction can be downward when the voice content is a lie, or the pupil diameter may increase when the voice emotion is fear, and the like.

Alternatively, a data mining algorithm may be used to mine the association, thereby obtaining the driving model. A person skilled in the art can understand that the specific processing may be selected as needed, as long as the association between the eye movement feature data and the speech feature data can be obtained by the processing, and the specific implementation of obtaining the driving model is not limited by the present embodiment.

S203, synthesizing an eye movement of the virtual human according to speech input data and the driving model and controlling the virtual human to exhibit the synthesized eye movement.

Specifically, the speech input data is taken as an input to the driving model to obtain the eye movement behavior data corresponding to the speech input data, then the eye movements that the virtual human needs to exhibit is synthesized according to the eye movement behavior data. Eventually, the virtual human is controlled to exhibit the eye movement synthesized according to the speech input data.

The speech input data may be the voice data of the virtual human. For example, the virtual human may need to exhibit the corresponding eye movement according to the voice content of itself. For example, when the current voice content of the virtual human is a lie, the eye movement exhibited correspondingly may be an eye movement with a flickering line of sight direction.

Alternatively, the speech input data may also be voice data input by the user. For example, the virtual human may need to exhibit a corresponding eye movement according to the voice input of the user. For example, when the voice content of the user is about reprimanding the virtual human, the virtual human may exhibit a fearful eye movement or the like.

The method for eye movement synthesis provided by the present disclosure includes: obtaining eye movement feature data and a speech feature data, where the eye movement feature data reflects an eye movement behavior and the speech feature data reflects a voice feature; obtaining a driving model according to the eye movement feature data and the speech feature data, where the driving model is configured to indicate an association between the eye movement feature data and the speech feature data; and synthesizing an eye movement of the virtual human according to speech input data and the driving model and controlling the virtual human to exhibit the synthesized eye movement. By constructing the driving model according to the association between the eye movement feature data and the speech feature data, the virtual human can exhibit an eye movement corresponding to the voice data, thereby avoiding the artificialness in the eye movement behavior of the virtual human, making the interaction more genuine.

Figure 3:
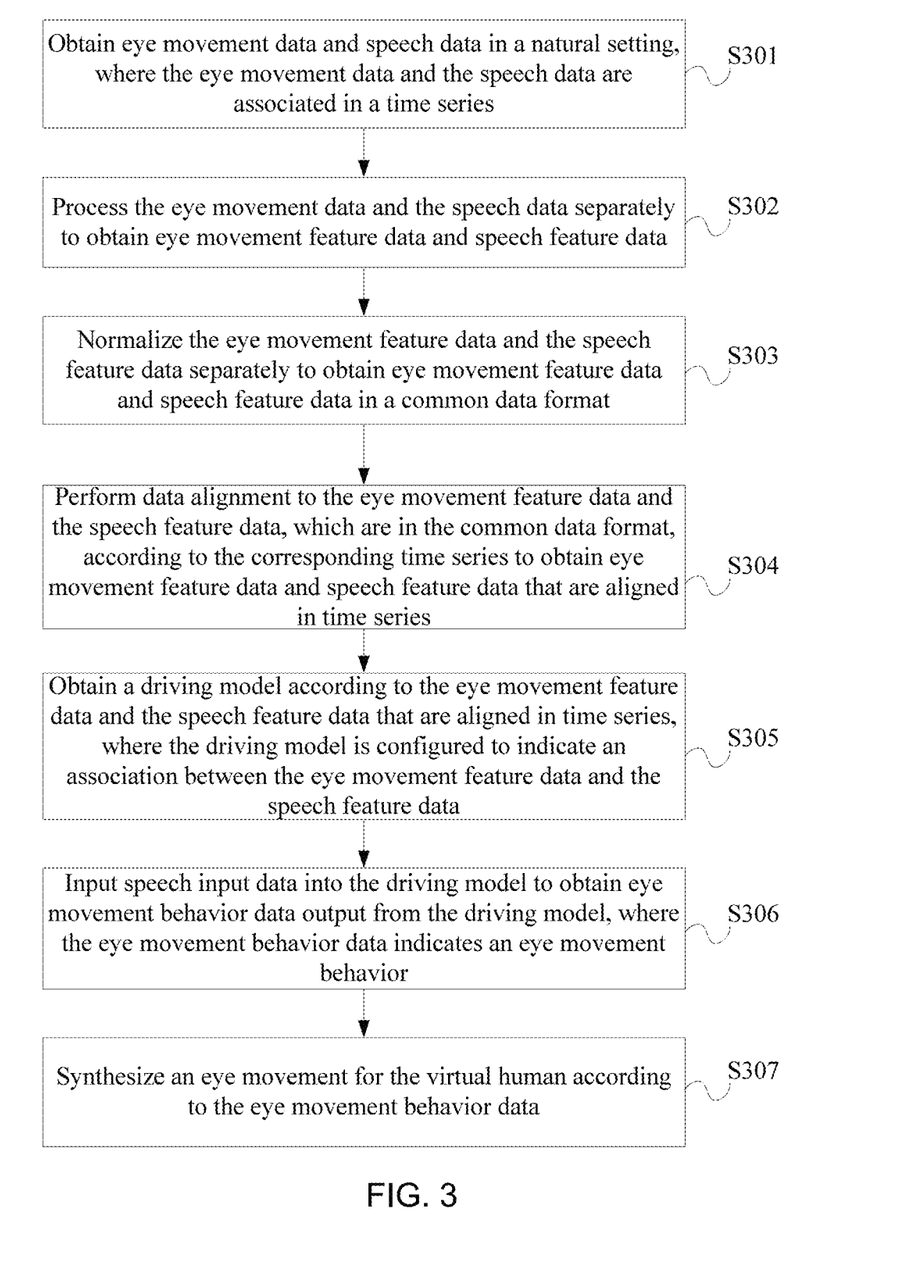
FIG. 3 is flowchart 2 of a method for eye movement synthesis provided by an embodiment of the present disclosure.

Based on the above embodiment, the technical solution of the embodiment shown in FIG. 1 will be further described in detail below with reference to a specific embodiment. Reference is made to FIG. 3, which is flowchart 2 of a method for eye movement synthesis provided by an embodiment of the present disclosure. As shown in FIG. 3, the method includes:

S301, obtaining eye movement data and speech data in a natural setting, where the eye movement data and the speech data are associated in a time series.

The natural setting is when the user is engaged in a natural conversation. In a possible implementation, image data of the user may be captured by an image acquisition device from a first person angle or a third person angle, where the image data of the user may be, e.g., a photo, a video or the like, which is not limited by the present embodiment.

Secondly, eye movement data of the user is obtained according to the image data of the user, where the eye movement data may be, e.g., a photo of the condition of the user's eyes, and may also be, e.g., a video of the user's eye movement, where the image acquisition device may be, e.g., a video camera, a smartphone, a photo camera, a webcam and the like. The implementation for obtaining the eye movement data is not limited by the present embodiment.

Furthermore, the speech data may, for example, be captured by a sound collecting device, where the sound collecting device may include, e.g., a smartphone, a tape recorder, a voice recorder and the like. Any device that can be used in collecting sound may be used for capturing the speech data.

In the present embodiment, in order to obtain the association between the eye movement data and the speech data, it is necessary to determine the state of the corresponding eye movement data when the user utters a certain speech data. Specifically, the eye movement data and the speech data obtained in the present embodiment are associated in a time series.

Assuming that a ten minutes speech data has been captured from a user by a video camera, and correspondingly, a ten minutes eye movement data has also been obtained from the user. Thus, for the ten minutes, eye movement data at each time node has its corresponding speech data.

In an optional implementation, the eye movement data and the speech data of the user may be directly obtained from a network resource without any in-situ collection, so as to reduce the operational difficulty.

S302, processing the eye movement data and the speech data separately to obtain eye movement feature data and speech feature data.

Thus, the eye movement data is processed to obtain the eye movement feature data, which includes at least one of the following: pupil diameter, point of gaze, gaze duration, line of sight direction, eyeball rolling speed, eyeball rolling track, eyeball rolling pattern, blinking motion.

Specifically, for example, the point of gaze, gaze duration and the like may be obtained through an automatic eye movement tracking algorithm or semi-automatic eye movement tracking algorithm. For example, the eyeball rolling speed, eyeball rolling track, eye rolling pattern, blinking motion and the like may be obtained by manually annotating an eye movement. The algorithm used in the specific processing is not limited by the present embodiment. In the actual implementation, any effective algorithm may be selected to implement the obtaining eye movement feature data.

Optionally, in view of the fact that a single eye movement feature data is only fleeting, more eye movement feature data that are continuous in time domain may be analyzed in combination of context information of the eye movement feature data to obtain time-series information of the eye movement feature data, which may be, e.g., line of sight direction, and may be, e.g., line of sight track and the like, which is not limited herein. the eye movement behavior can be more holistic and continuous by obtaining the time-series information of the eye movement feature data.

In the present embodiment, the speech data is processed to obtain speech feature data, where the speech feature data includes at least one of the following: voice content, syntactic structure, voice emotion, phoneme, rhythm, intonation.

Specifically, for example, the voice content may be obtained through voice recognition. For example, the syntactic structure may be obtained through a word segmentation algorithm. Additionally, manual annotation may be used to obtain the voice emotion of the voice data. The specific implementation for processing the speech data is not particularly limited by the present embodiment. Rather, any specific implementation may be selected as needed, as long as data reflecting a voice feature can be obtained.

S303, normalizing the eye movement feature data and the speech feature data separately to obtain eye movement feature data and speech feature data in a common data format.

Furthermore, the eye movement feature data and the speech feature data are converted separately into data in a common data format, where the data format is a rule for describing data storage, which may be, for example, a basic data format such as integer, Boolean and the like. Or, it may be data formats such as extensible markup language (XML) and JavaScript Object Notation (JSON) or other data format, which is not limited by the present embodiment, as long as the eye movement feature data and the speech feature data are using the same data format.

In an optional embodiment, the normalization may further include normalizing a data size of the eye movement feature data and the speech feature data, or unifying the data unit or the like. A person skilled in the art can understand that any processing that makes eye movement feature data and speech feature data uniform in terms of the format, storage mode, metric unit and/or the like in order to improve data processing efficiency may be considered as normalization, whose specific implementation may be selected according to actual needs and is not limited by the present embodiment.

The efficiency in data processing can be improved by converting the eye movement feature data and the speech feature data into data in a common data format.

S304, performing data alignment to the eye movement feature data and the speech feature data, which are in the common data format, according to the corresponding time series to obtain eye movement feature data and speech feature data that are aligned in time series.

In the present embodiment, the eye movement data and the speech data are associated in time series, thus the eye movement feature data and the speech feature data can likewise be associated according to the time series. For example, the data alignment may be performed by an image frame, thereby determining, for each image frame, the eye movement feature data and the associated speech feature data.

Optionally, the data alignment between the eye movement feature data and the speech feature data may also be performed according to the corresponding time series by a millisecond of time, and the specific implementation is not limited by the present embodiment, as long as the association between the eye movement feature data and the speech feature data in time series can be ensured.

The association between the eye movement feature data and the speech feature data can be quickly obtained by performing the data alignment according to time series, thereby improving the accuracy and efficiency in the data processing.

S305, obtaining a driving model according to the eye movement feature data and the speech feature data that are aligned in time series, where the driving model is configured to indicate an association between the eye movement feature data and the speech feature data.

Furthermore, in the present embodiment, the time series includes a plurality of time points, where a time point may, for example, correspond to an image frame or, for example, a preset time unit (e.g., millisecond).

Secondly, the eye movement feature data and speech feature data at each time point are inputted into a preset processing model to obtain the association between the eye movement feature data and the speech feature data at each time point, where the preset processing model is configured to obtain the association between the eye movement feature data and the speech feature data. For example, the preset processing model may be a machine learning algorithm, or any effective data mining algorithm or the like, which is not limited herein.

Furthermore, the driving model is obtained according to the association between the eye movement feature data and the speech feature data at each time point, where the driving model includes the association between the eye movement feature data and the speech feature data.

S306, inputting speech feature data into the driving model to obtain eye movement behavior data output from the driving model, where the eye movement behavior data indicates an eye movement behavior.

S307, synthesizing an eye movement for the virtual human according to the eye movement behavior data.

Thus, the speech input data is inputted into the driving model to obtain the eye movement behavior data output from the driving model, the eye movement behavior data being configured to indicate the eye movement of the virtual human. For example, it may be configured to indicate extending the pupil diameter to a preset dilated diameter, or indicate moving the line of sight direction slowly downward.

The eye movement of the virtual human is synthesized according to the specific information indicated by the eye movement behavior data, where the eye movement behavior data is obtained according to the speech input data and the driving model, so that the virtual human can exhibit an eye movement corresponding to the voice data.

The method for eye movement synthesis provided by the embodiment of the present disclosure includes: obtaining eye movement data and speech data in a natural setting, where the eye movement data and the speech data are associated in a time series; processing the eye movement data and the speech data separately to obtain eye movement feature data and speech feature data; normalizing the eye movement feature data and the speech feature data separately to obtain eye movement feature data and speech feature data in a common data format; performing data alignment to the eye movement feature data and the speech feature data, which are in the common data format, according to the corresponding time series to obtain eye movement feature data and the speech feature data that are aligned in time series; obtaining a driving model according to the eye movement feature data and the speech feature data that are aligned in time series, where the driving model is configured to indicate an association between the eye movement feature data and the speech feature data; inputting speech input data into the driving model to obtain eye movement behavior data output from the driving model, where the eye movement behavior data indicates an eye movement behavior; and synthesizing an eye movement for the virtual human according to the eye movement behavior data. The efficiency and accuracy in the data processing can be effectively improved by performing the normalization and the data alignment to the eye movement feature data and speech feature data. Additionally, the eye movement behavior data indicating the eye movement behavior of the virtual human is obtained according to speech input data and the driving model, thus synthesizing the eye movement that the virtual human needs to exhibit according to the eye movement behavior data, so that a robot can exhibit a corresponding eye movement according to a voice content, thereby enhancing the naturalness in the interaction and improving the user experience.

On the basis of the above embodiments, the method for eye movement synthesis provided by the embodiment of the present disclosure may further include correcting the eye movement behavior data after obtaining the eye movement behavior data output from the driving model, so as to improve the correctness in the eye movement behavior, which will be described below with reference to a specific embodiment.

the eye movement behavior data output from the driving model is inputted into a psychological correcting model to obtain psychologically corrected eye movement behavior data, where the psychological correcting model is configured to make correction based on influence from a psychological behavior to an eye movement behavior; and/or the eye movement behavior data output from the driving model is inputted into a time domain correcting model to obtain eye movement behavior data that are continuous in time domain, where the time domain correcting model is configured to make an eye movement behavior to be continuous in time domain.

Firstly, only the implementation of the psychological correction for eye movement behavior data is described. Specifically, for example, there is a psychological behavior that a user will avoid over extended eye contact in a natural setting. For example, there is also a psychological behavior that when a user is lying, the line of sight direction tends to turn towards a specific direction. Thus, multiple psychological correcting models can be constructed according to multiple psychological behaviors for performing psychological correction on the eye movement behavior data outputted from the driving model, thus making the output eye movement behavior data to conform more to a real situation.

A person skilled in the art can understand that the specific psychological behavior may be designed and selected according to actual needs, which is not particularly limited by the present embodiment.

For example, a psychological correction may be performed on eye movement data in multiple image frames together according to a preset period, or a psychological correction may be performed on the eye movement behavior data outputted from the driving model in real-time, which is not limited herein.

Secondly, only the implementation for time domain correcting the eye movement behavior data is described. Specifically, the eye movement behavior data output from the driving model indicates an eye movement behavior at a single time point, which is discrete in time domain, and failure to establish continuity in time domain will lead to an unnatural skipping in the eye movement of the virtual human.

Base on the foregoing, the present embodiment inputs the eye movement behavior data outputted from the driving model into the time domain correcting model to obtain an eye movement behavior data that is continuous in time domain, where the time domain correcting model is configured to make the eye movement behavior continuous in time domain. The time domain correcting model may be constructed according to a thermodynamic diagram of attention and a pattern of human eye movement, where the thermodynamic diagram of attention reflects the probability of attention of the line of sight direction to different areas of a scene in a natural setting, and the pattern of human eye movement reflects how the human eye moves to various directions in a natural setting.

Optionally, the time domain correcting model may also be constructed using collected eye movement data and the like, which is not limited by the present embodiment, as long as the time domain correcting model can obtain a continuous line of sight track according to discrete eye movement behavior data.

Furthermore, when the psychological correcting and the time domain correcting are both involved, for example, the eye movement behavior data output by the driving model may be firstly inputted into the psychological correcting model, then into the time domain correcting model to obtain the eye movement behavior data that has been psychological corrected and is continuous in time domain. The processing order may also be reversed, that is, the time domain continuous correcting is performed first, and then the psychological correcting is performed, where the specific implementation of the time domain correcting and the psychological correcting are similar to those described above, and are not described herein again.

The method for eye movement synthesis provided by embodiments of the present disclosure includes: inputting the eye movement behavior data output from the driving model into a psychological correcting model to obtain psychologically corrected eye movement behavior data, where the psychological correcting model is configured to make correction based on influence from a psychological behavior to an eye movement behavior; and/or inputting the eye movement behavior data output from the driving model into a time domain correcting model to obtain eye movement behavior data that are continuous in time domain, where the time domain correcting model is configured to make an eye movement behavior to be continuous in time domain. By applying psychological correction to the eye movement behavior output by the driving model output, the eye movement of the virtual human can conform more to that under the real setting, so as to enhance the naturalness in the interaction. Moreover, by applying time domain continuity processing to the eye movement outputted from the driving model, it is possible to avoid unnatural skipping in the eye movement of the virtual human, improving the continuity in the eye movement.

Figure 4:
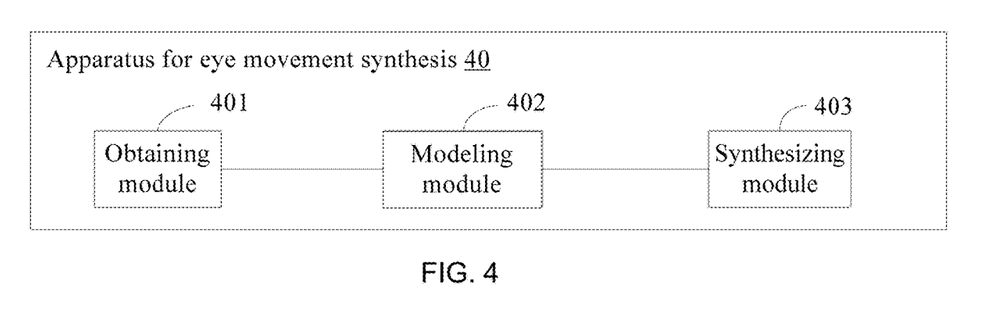
FIG. 4 is schematic structural diagram 1 of an apparatus for eye movement synthesis provided by an embodiment of the present disclosure.

FIG. 4 is schematic structural diagram 1 of an apparatus for eye movement synthesis provided by an embodiment of the present disclosure. As shown in FIG. 4, the apparatus 40 includes: an obtaining module 401, a modeling module 402 and a synthesizing module 403.

The obtaining module 401 is configured to obtain eye movement feature data and a speech feature data, where the eye movement feature data reflects an eye movement behavior and the speech feature data reflects a voice feature.

The modeling module 402 is configured to obtain a driving model according to the eye movement feature data and the speech feature data, where the driving model is configured to indicate an association between the eye movement feature data and the speech feature data.

The synthesizing module 403 is configured to synthesize an eye movement of the virtual human according to speech input data and the driving model and controlling the virtual human to exhibit the synthesized eye movement.

Optionally, the modeling module 402 is specifically configured to:

normalize the eye movement feature data and the speech feature data separately to obtain eye movement feature data and speech feature data in a common data format;

perform data alignment to the eye movement feature data and the speech feature data, which are in the common data format, according to the corresponding time series to obtain eye movement feature data and speech feature data that are aligned in time series; and obtain a driving model according to the eye movement feature data and the speech feature data that are aligned in time series.

Optionally, the modeling module 402 is specifically configured to:

input the eye movement feature data and the speech feature data at each time point into a preset processing model to obtain an association between the eye movement feature data and the speech feature data at the each time point, where the preset processing model is configured to obtain the association between the eye movement feature data and the speech feature data; and obtain a driving model according to the association between the eye movement feature data and the speech feature data at the each time point.

Optionally, the obtaining module 401 is specifically configured to:

obtain eye movement data and speech data in a natural setting, where the eye movement data and the speech data are associated in a time series; and process the eye movement data and the speech data separately to obtain the eye movement feature data and the speech feature data.

Optionally, the eye movement feature data includes at least one of the following: pupil diameter, point of gaze, gaze duration, line of sight direction, eyeball rolling speed, eyeball rolling track, eye rolling pattern, and blinking motion.

The speech feature data includes at least one of the following: voice content, syntactic structure, voice emotion, phoneme, rhythm, and intonation.

Optionally, the synthesizing module 403 is specifically configured to:

input speech input data into the driving model to obtain eye movement behavior data output from the driving model, where the eye movement behavior data indicates an eye movement behavior;

synthesize an eye movement for the virtual human according to the eye movement behavior data and control the virtual human to exhibit the synthesized eye movement.

The apparatus provided by the present embodiment can be configured to execute the technical solutions in the above-mentioned method embodiments, with similar implementation principals and technical effects, which will not be described again in the present embodiment.

Figure 5:
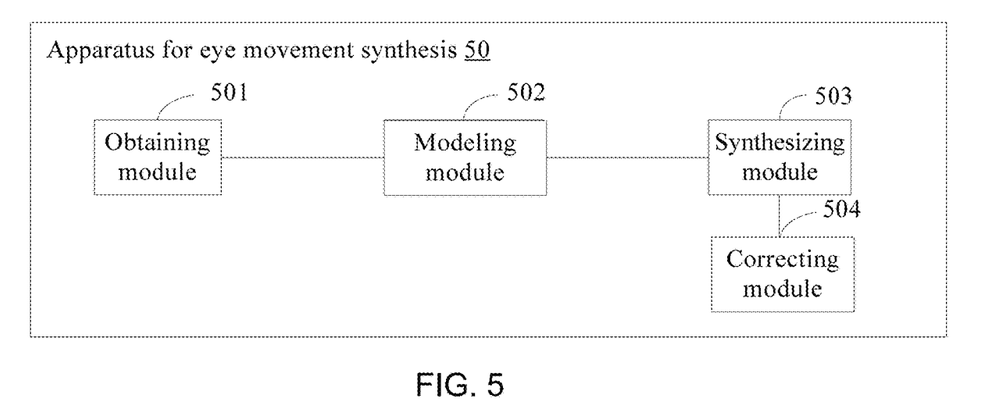
FIG. 5 is schematic structural diagram 2 of an apparatus for eye movement synthesis provided by an embodiment of the present disclosure.

FIG. 5 is schematic structural diagram 2 of an apparatus for eye movement synthesis provided by an embodiment of the present disclosure. As shown in FIG. 5, on the basis of the embodiment in FIG. 4, the present embodiment further includes: a correcting module 504.

Optionally, the correcting module 504 is specifically configured to: after obtaining eye movement behavior data output from the driving model, input the eye movement behavior data output from the driving model into a psychological correcting model to obtain psychologically corrected eye movement behavior data, where the psychological correcting model is configured to make correction based on influence from a psychological behavior to an eye movement behavior; and/or input the eye movement behavior data output from the driving model into a time domain correcting model to obtain eye movement behavior data that are continuous in time domain, where the time domain correcting model is configured to make an eye movement behavior to be continuous in time domain.

The apparatus provided by the present embodiment can be configured to execute the technical solutions in the above-mentioned method embodiments, with similar implementation principals and technical effects, which will not be described again in the present embodiment.

Figure 6:
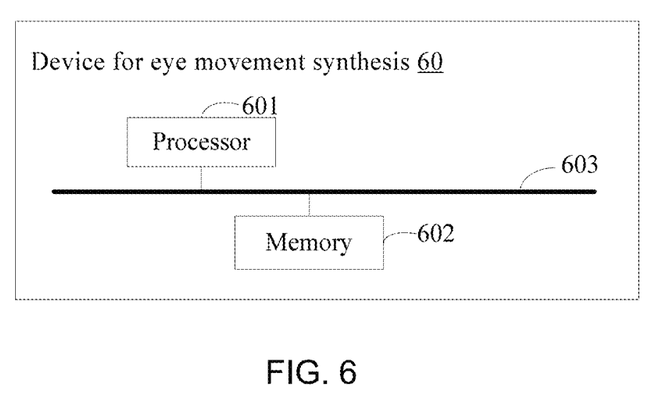
FIG. 6 is schematic structural diagram of hardware of a device for eye movement synthesis provided by an embodiment of the present disclosure.

FIG. 6 is schematic structural diagram of hardware of a device for eye movement synthesis provided by an embodiment of the present disclosure. As shown in FIG. 6, the device 60 for eye movement synthesis in the present embodiment includes: a processor 601 and a memory 602, where:

the memory 602 is configured to store computer executable instructions;

the processor 601 is configured to execute the computer executable instructions stored in the memory to implement the steps executed in the method for eye movement synthesis according to the above-mentioned embodiments. The details may be found in the related description in the foregoing method embodiments.

Optionally, the memory 602 may either be standalone or integrated with the processor 601.

When the memory 602 is standalone, the apparatus for eye movement synthesis further includes a bus 603, configured to connect the memory 602 and the processor 601.

An embodiment of the present disclosure further provides a computer readable storage medium, storing thereon computer executable instructions which, when executed by the processor, implement the method for eye movement synthesis executed by the above-mentioned device for eye movement synthesis.

In the several embodiments provided by the present disclosure, it should be understood that the disclosed devices and methods may be implemented in other manners. For example, the device embodiments described above are only illustrative. For example, the division of the modules is only based on logical function, and there may be other division manners in actual implementation. For example, multiple modules may be combined or integrated into another system, or some features may be omitted or skipped. In addition, the mutual coupling or direct coupling or communication connection shown or discussed may be an indirect coupling or communication connection through some interface, apparatuses or modules, and may be in electrical, mechanical or other forms.

The above-mentioned integrated modules implemented in the form of software function modules may be stored in a computer readable storage medium. The software function modules are stored in a storage medium, and include several instructions configured to cause a computer device (which may be a personal computer, a server, or a network device and the like) or a processor to execute part of the steps of the methods described in various embodiments of the present disclosure.

It should be understood that the above-mentioned processor may be a central processing unit (CPU), or may be some other general-purpose processor, a digital signal processor (DSP), an application specific integrated circuit (ASIC) and the like. The general-purpose processor may be a microprocessor, or the processor may also be any conventional processor or the like. The steps of the method disclosed in connection with the disclosure may be directly embodied by the execution of a hardware processor or by the execution of hardware in combination of software modules in the processor.

The memory may include a high speed RAM memory, and may also include a non-volatile memory (NVM), such as at least one disk storage, and may also be a USB thumb, a removable hard disk, a read only memory, a magnetic disk, or a compact disk.

The bus may be an industry standard architecture (ISA) bus, a peripheral component (PCI) bus, or an extended industry standard architecture (EISA) bus and the like. The bus can be divided into an address bus, a data bus, a control bus and the like. For ease of representation, the bus in the accompanying drawings of the present disclosure is not limited to only one bus or only one type of bus.

The above-mentioned storage medium may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a magnetic disk, or an optical disk. The storage medium may be any available media that can be accessed by a general-purpose or special-purpose computer.

A person of ordinary skill in the art may understand that: all or part of the steps to implement the above-mentioned embodiments of the method may be accomplished by a hardware associated with program instructions. The program may be stored in a computer readable storage medium. The program, when executed, performs the steps included in the various method embodiments. The storage medium includes: various media, such as a ROM, a RAM, a magnetic disk, or a compact disk, that can store program codes.

Finally, it should be noted that the above embodiments are merely used to illustrate, rather than to limit, the technical solutions of the present disclosure. Although the present disclosure has been described in detail with reference to the foregoing embodiments, a person skilled in the art should understand that the technical solutions described in the foregoing embodiments may be modified, or some or all of the technical features may be equivalently substituted; and the modification or substitution does not cause the corresponding technical solutions to depart from the scope of the technical solutions of the embodiments of the present disclosure.

What is claimed is:

1. A method for eye movement synthesis, comprising:
obtaining eye movement feature data and speech feature data, wherein the eye movement feature data reflects an eye movement behavior, and the speech feature data reflects a voice feature;
obtaining a driving model according to the eye movement feature data and the speech feature data, wherein the driving model is configured to indicate an association between the eye movement feature data and the speech feature data; and
synthesizing an eye movement of a virtual human according to speech input data and the driving model and controlling the virtual human to exhibit the synthesized eye movement,
wherein the obtaining a driving model according to the eye movement feature data and the speech feature data comprises:
normalizing the eye movement feature data and the speech feature data separately to obtain eye movement feature data and speech feature data in a common data format;
performing data alignment to the eye movement feature data and the speech feature data in the common data format according to a time series corresponding thereto to obtain eye movement feature data and speech feature data aligned in time series; and
obtaining a driving model according to the eye movement feature data and the speech feature data aligned in time series.

2. The method according to claim 1, wherein the time series comprises a plurality of time points, and the obtaining a driving model according to the eye movement feature data and the speech feature data aligned in time series comprises:
inputting the eye movement feature data and the speech feature data at each of the time points into a preset processing model to obtain an association between the eye movement feature data and the speech feature data at each of the time points, wherein the preset processing model is configured to obtain an association between eye movement feature data and speech feature data; and
obtaining a driving model according to the associations between the eye movement feature data and the speech feature data at each of the time points.

3. The method according to claim 1, wherein the obtaining eye movement feature data and speech feature data comprises:
obtaining eye movement data and speech data in a natural setting, wherein the eye movement data and the speech data are associated in time series; and
processing the eye movement data and the speech data separately to obtain the eye movement feature data and the speech feature data.

4. The method according to claim 1, wherein the eye movement feature data comprises at least one of the following: a pupil diameter, a point of gaze, a gaze duration, a line of sight direction, an eyeball rolling speed, an eyeball rolling track, an eyeball rolling pattern, and a blinking motion; and
the speech feature data comprises at least one of the following: a voice content, a syntactic structure, a voice emotion, a phoneme, a rhythm, and an intonation.

5. The method according to claim 1, wherein the synthesizing an eye movement of a virtual human according to speech input data and the driving model comprises:
inputting speech input data into the driving model to obtain eye movement behavior data output from the driving model, wherein the eye movement behavior data indicates an eye movement behavior; and
synthesizing an eye movement of a virtual human according to the eye movement behavior data.

6. The method according to claim 5, wherein, after the obtaining eye movement behavior data output from the driving model, the method further comprises at least one of:
inputting the eye movement behavior data output from the driving model into a psychological correcting model to obtain psychologically corrected eye movement behavior data, wherein the psychological correcting model is configured to make correction based on influence of psychological behavior on an eye movement behavior; and
inputting the eye movement behavior data output from the driving model into a time domain correcting model to obtain eye movement behavior data that are continuous in the time domain, wherein the time domain correcting model is configured to make an eye movement behavior to be continuous in the time domain.

7. A non-transitory computer readable storage medium, comprising instructions which, when executed by a computer, cause the computer to perform the method according to claim 1.

8. A device for eye movement synthesis, comprising:
a memory, configure to store a program; and
a processor, configured to execute the program stored in the memory, the processor being configured to, when the program is executed, perform steps of:
obtaining eye movement feature data and speech feature data, wherein the eye movement feature data reflects an eye movement behavior, and the speech feature data reflects a voice feature;
obtaining a driving model according to the eye movement feature data and the speech feature data, wherein the driving model is configured to indicate an association between the eye movement feature data and the speech feature data; and
synthesizing an eye movement of a virtual human according to speech input data and the driving model and controlling the virtual human to exhibit the synthesized eye movement,
wherein the processor is further configured to perform steps of:
normalizing the eye movement feature data and the speech feature data separately to obtain eye movement feature data and speech feature data in a common data format;
performing data alignment to the eye movement feature data and the speech feature data in the common data format according to a time series corresponding thereto to obtain eye movement feature data and speech feature data aligned in time series; and
obtaining a driving model according to the eye movement feature data and the speech feature data aligned in time series.

9. The device according to claim 8, wherein the time series comprises a plurality of time points, and the processor is further configured to perform steps of:
inputting the eye movement feature data and the speech feature data at each of the time points into a preset processing model to obtain an association between the eye movement feature data and the speech feature data at each of the time points, wherein the preset processing model is configured to obtain an association between eye movement feature data and speech feature data; and
obtaining a driving model according to the associations between the eye movement feature data and the speech feature data at each of the time points.

10. The device according to claim 8, wherein the processor is further configured to perform steps of:
obtaining eye movement data and speech data in a natural setting, wherein the eye movement data and the speech data are associated in time series; and
processing the eye movement data and the speech data separately to obtain the eye movement feature data and the speech feature data.

11. The device according to claim 8, wherein the eye movement feature data comprises at least one of the following: a pupil diameter, a point of gaze, a gaze duration, a line of sight direction, an eyeball rolling speed, an eyeball rolling track, an eyeball rolling pattern, and a blinking motion; and the speech feature data comprises at least one of the following: a voice content, a syntactic structure, a voice emotion, a phoneme, a rhythm, and an intonation.

12. The device according to claim 8, wherein the processor is further configured to perform steps of:
inputting speech input data into the driving model to obtain eye movement behavior data output from the driving model, wherein the eye movement behavior data indicates an eye movement behavior; and
synthesizing an eye movement of a virtual human according to the eye movement behavior data.

13. The device according to claim 12, wherein the processor is further configured to perform at least one of steps of:
inputting the eye movement behavior data output from the driving model into a psychological correcting model to obtain psychologically corrected eye movement behavior data, wherein the psychological correcting model is configured to make correction based on influence of psychological behavior on an eye movement behavior; and
inputting the eye movement behavior data output from the driving model into a time domain correcting model to obtain eye movement behavior data that are continuous in the time domain, wherein the time domain correcting model is configured to make an eye movement behavior to be continuous in the time domain.

14. A device for eye movement synthesis, comprising:
a memory, configure to store a program; and
a processor, configured to execute the program stored in the memory, the processor being configured to, when the program is executed, perform steps of:
obtaining eye movement feature data and speech feature data, wherein the eye movement feature data reflects an eye movement behavior, and the speech feature data reflects a voice feature;
obtaining a driving model according to the eye movement feature data and the speech feature data, wherein the driving model is configured to indicate an association between the eye movement feature data and the speech feature data; and
synthesizing an eye movement of a virtual human according to speech input data and the driving model and controlling the virtual human to exhibit the synthesized eye movement,
wherein the processor is further configured to perform steps of:
inputting speech input data into the driving model to obtain eye movement behavior data output from the driving model, wherein the eye movement behavior data indicates an eye movement behavior;
synthesizing an eye movement of a virtual human according to the eye movement behavior data,
wherein after the obtaining eye movement behavior data output from the driving model, the processor is further configured to perform steps of:
inputting the eye movement behavior data output from the driving model into a psychological correcting model to obtain psychologically corrected eye movement behavior data, wherein the psychological correcting model is configured to make correction based on influence of psychological behavior on an eye movement behavior; and
inputting the eye movement behavior data output from the driving model into a time domain correcting model to obtain eye movement behavior data that are continuous in the time domain, wherein the time domain correcting model is configured to make an eye movement behavior to be continuous in the time domain.

15. The device according to claim 14, wherein the processor is further configured to perform steps of:
obtaining eye movement data and speech data in a natural setting, wherein the eye movement data and the speech data are associated in time series; and
processing the eye movement data and the speech data separately to obtain the eye movement feature data and the speech feature data.

16. The device according to claim 14, wherein the eye movement feature data comprises at least one of the following: a pupil diameter, a point of gaze, a gaze duration, a line of sight direction, an eyeball rolling speed, an eyeball rolling track, an eyeball rolling pattern, and a blinking motion; and
the speech feature data comprises at least one of the following: a voice content, a syntactic structure, a voice emotion, a phoneme, a rhythm, and an intonation.

* * * * *